United States Patent [19]
Häfner

[11] Patent Number: 5,301,555
[45] Date of Patent: Apr. 12, 1994

[54] METHOD AND APPARATUS FOR MEASURING THE MASS THROUGHPUT OF A FLOW OF MATERIAL ACCORDING TO THE CORIOLIS PRINCIPLE

[75] Inventor: Hans W. Häfner, Aichach-Walchshofen, Fed. Rep. of Germany

[73] Assignee: Pfister GmbH, Augsberg, Fed. Rep. of Germany

[21] Appl. No.: 961,941

[22] Filed: Oct. 16, 1992

[30] Foreign Application Priority Data

Oct. 17, 1991 [DE] Fed. Rep. of Germany ....... 4134319

[51] Int. Cl.⁵ ............................ G01F 1/74; G01F 1/82
[52] U.S. Cl. .................................. 73/861.04; 73/195; 73/861.36
[58] Field of Search ................ 73/195, 861.04, 861.35, 73/861.36, 861.37, 861.38; 222/55, 63

[56] References Cited

U.S. PATENT DOCUMENTS

| | | | |
|---|---|---|---|
| 4,083,243 | 4/1978 | Cochran, Jr. ................ | 73/861.04 X |
| 4,198,860 | 4/1980 | King ................................. | 73/195 |
| 4,341,107 | 7/1982 | Blair et al. ..................... | 73/195 X |
| 4,691,578 | 9/1987 | Herzl ............................... | 73/861.38 |
| 4,711,132 | 12/1987 | Dahlin ............................. | 73/861.38 |
| 4,821,581 | 4/1989 | Jost ................................... | 73/861.36 |

*Primary Examiner*—Herbert Goldstein
*Attorney, Agent, or Firm*—Armstrong, Westerman, Hattori, McLeland & Naughton

[57] ABSTRACT

A method and apparatus for determining mass throughput of material to be conveyed through an essentially closed conveying system. In addition to a mass measuring device for determining the throughput of a flow of a conveying fluid carrying the material to be conveyed, there is provided a second measuring device for determining the mass of conveying fluid supplied to the conveying system. Subtracting the values measured results in a very accurate indication of the mass of material momentarily conveyed, without error caused by the conveying fluid.

22 Claims, 6 Drawing Sheets

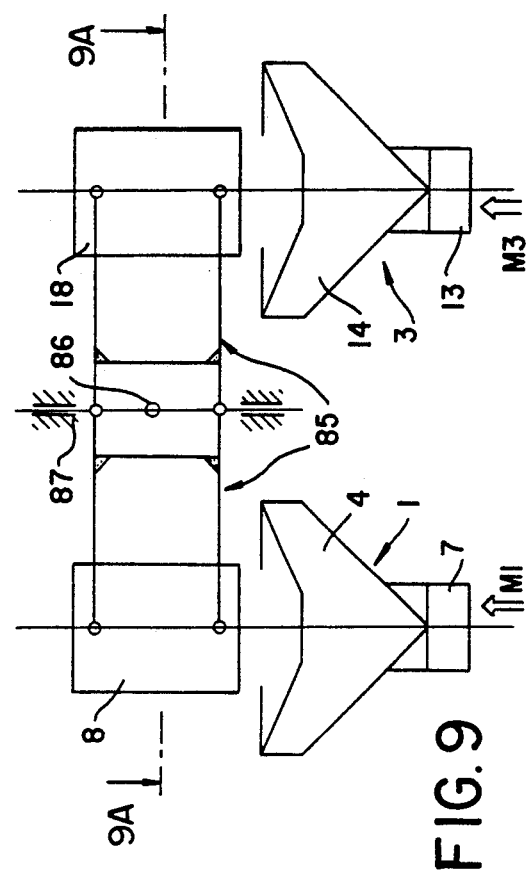
FIG. 9
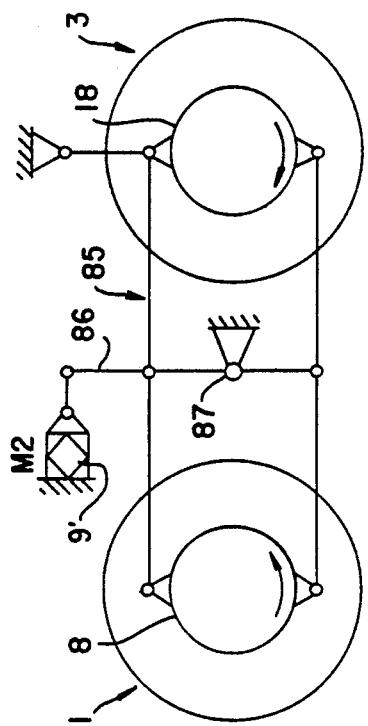
FIG. 9A
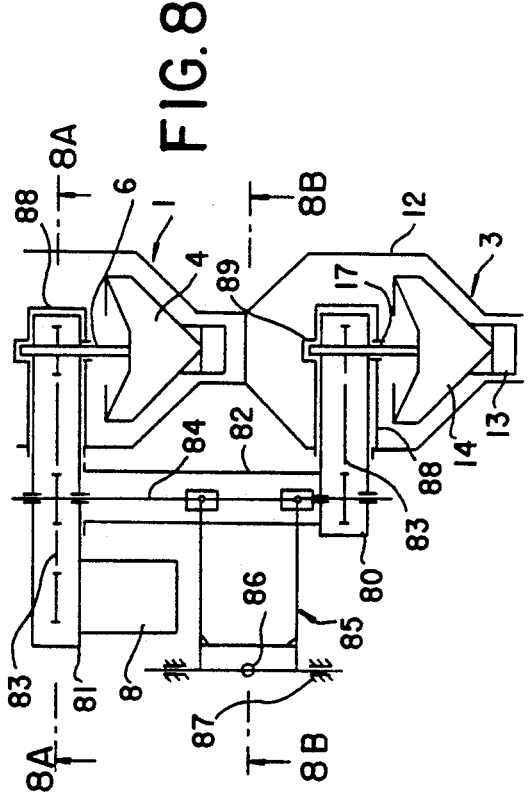
FIG. 8
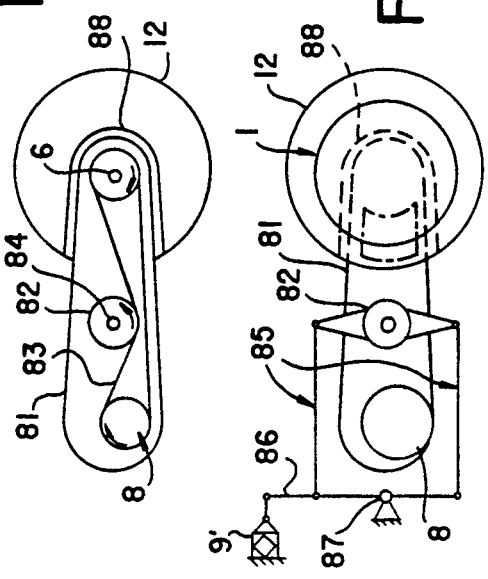
FIG. 8A
FIG. 8B

METHOD AND APPARATUS FOR MEASURING THE MASS THROUGHPUT OF A FLOW OF MATERIAL ACCORDING TO THE CORIOLIS PRINCIPLE

TECHNICAL FIELD

The invention relates to a method and apparatus for measuring the mass throughput of a flow of material, preferably pourable material, according to the Coriolis Principle.

BACKGROUND OF THE ART

The German Patent Application Publication No. 25 44 976 discloses an apparatus for determining the mass throughput of pourable material, as lime dust or fine ore. The measurement is based on the effective inertia force, i.e. Coriolis force, caused by moving mass particles hitting a rotating reference body, as a measuring wheel comprising a rotating disk bearing radially extending guiding blades thereon, the pourable material being hurled off essentially vertical in respect of the axis of rotation. Changes in the driving torque are used as measurement value for determining the mass throughput which at constant angular speed of the measuring wheel is directly proportional to the measured torque. For detecting torque changes the known apparatus uses the power consumption of the driving motor.

Similar apparatuses are known from the German Patent Application Publications No. 33 46 145 and No. 39 40 576, where instead of measuring the power consumption of the driving motor the latter is supported pivotally or rotationally, respectively, and the reaction torque is directed to a laterally arranged load cell. In operation of the known apparatuses it is assumed for pneumatically conveyed pourable material that the mass of the heavy phase of a mass flow is very large, as compared with the mass of the gas, usually air or a conveying gas, contained in the mass flow, such that the gas quantity may be disregarded when determining the mass based on changes in torque. In the above mentioned German Patent Application Publication No. 33 46 145 it is mentioned that for compensating the latter should be fed back and the same air quantity should be used all the time in order to minimize measuring errors. Furthermore, it is suggested to provide a cellular wheel sluice in order to prevent acceleration of an uncontrolled air flow by the measuring wheel.

Similar means have been suggested in the description of a similar mass throughput measuring apparatus in Kochsiek: Handbuch des Wägens, pp. 378 to 380, Verlag Vieweg, 1988. Again, it is indicated that undesired air flows through the mass throughput measuring apparatus should be avoided by an appropriate design, i.e. by incorporating cellular sluices, supply worms, or the like. However, this is not possible for pneumatic conveying systems.

SUMMARY OF THE INVENTION

It is an object of the present invention to provide a method and apparatus for measuring the mass throughput of a flow of pourable material according to the Coriolis principle, having an increased measuring accuracy.

It is a further object of the present invention to provide a method and apparatus for measuring the mass throughput of a flow of pourable material according to the Coriolis principle, having a simple design.

It is a still further object of the present invention to provide a method and apparatus for measuring the mass throughput of a flow of pourable material according to the Coriolis principle, which may be used for various kinds of materials to be conveyed.

These and other objects of the present invention are achieved by a method for measuring the mass throughput of material added to a conveying fluid according to the Coriolis principle, comprising the steps of: providing an essentially closed material conveying system comprising a material charging station and a conveying fluid supply means upstream thereof; determining mass throughput of conveying fluid supplied to said system: charging said material to said system to be conveyed by said conveying fluid; guiding a flow of said conveying fluid carrying said material into a Coriolis principle measuring means for determining mass throughput of said flow; and subtracting said mass throughput of said conveying fluid supplied to said system from said mass throughput determined in said rotating measuring means.

According to another aspect of the invention there is provided an apparatus for measuring the mass throughput of material added to a conveying fluid according to the Coriolis principle, comprising: an essentially closed conveying system having inlet means for supplying said conveying fluid to said system and a charging station for charging material into said system for being conveyed by said conveying fluid; Coriolis principle measuring means incorporated in said system and having supplied thereto a flow of said conveying fluid carrying said material charged thereto, said Coriolis principle measuring means comprising rotatably driven measuring wheel means having guiding blades for radially deflecting said flow and means for determining changes in a driving torque acting on said measuring wheel means, which changes are in direct proportion to said mass throughput of said flow; means for determining mass throughput of said conveying fluid supplied to said system; and means for subtracting said mass throughput of said conveying fluid supplied to said system from said mass throughput of said flow determined by said Coriolis principle measuring means.

By separately determining the momentary mass of conveying fluid and subtracting the determined mass from the momentary overall mass comprising the masses of the conveyed material and the conveying fluid, the measuring accuracy of the apparatus is considerably increased. The measuring device for the conveying fluid may easily be incorporated in pneumatic conveying systems and even permits increasing of the throughput, since it may be formed as a conveying intensifier.

Further objects, features, and advantages of the method and apparatus according to the invention will become more apparent from the following description, by way of example, of preferred embodiments, with reference to the accompanying drawings.

BRIEF DESCRIPTION OF THE DRAWINGS

FIGS. 8, 8A and 8B show a seventh embodiment using an externally arranged driving device and torque measuring device, with two sectional views belonging together;

FIGS. 9 and 9A show an eighth embodiment comprising two single measuring devices arranged in parallel to each other;

BEST MODE OF CARRYING OUT THE INVENTION

Figure 1:
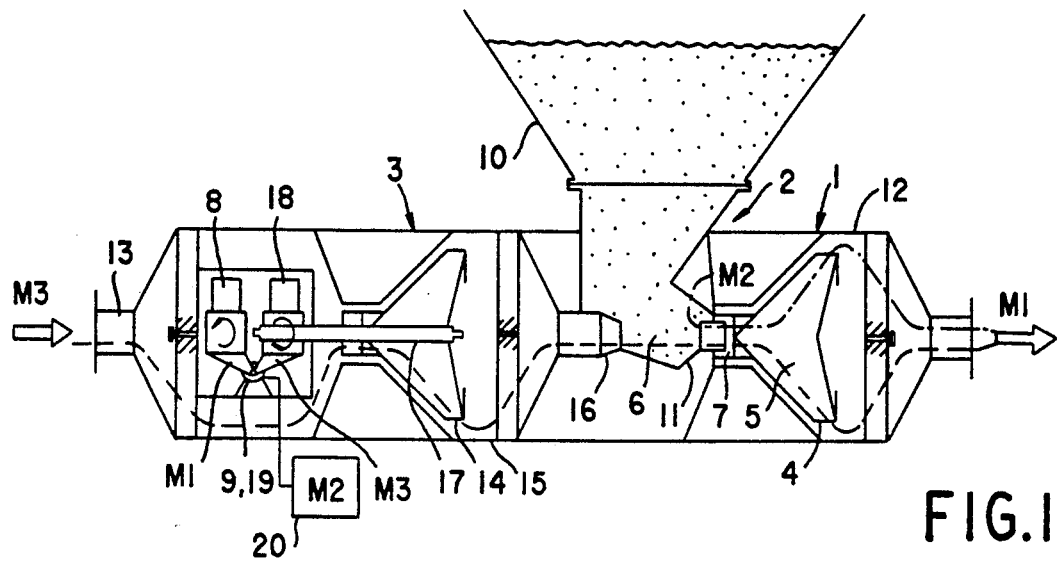
FIG. 1 is a schematic illustration of a first embodiment of the suggested apparatus for determining mass throughput.

FIG. 1 schematically illustrates the suggested apparatus for determining mass flow throughput. It comprises essentially a mass throughput measuring device 1, a charging device 2, and an additional conveying fluid measuring device 3 suggested now. The mass throughput measuring device 1 comprises essentially a measuring wheel 4 provided with guiding blades 5 for radial deflection of the mass flow M2 from the charging device 2. By means of the guiding blades 5 predetermined angular velocity is imposed on the flowing in mass flow. The force necessary therefor is in direct proportion to the mass flow. The feeding of the flow M2 of pourable material from the charging device 2 onto the measuring wheel 4 occurs in a central input region 7. After deflection the pourable material is seized by the guiding blades 5 at an angular speed of the rotating measuring wheel 4 and guided outward, accelerated by centrifugal forces. The particles of pourable material leave the measuring wheel 4 all around at the discharging edges of the guiding blades 5. The Coriolis acceleration caused upon the movement of the pourable material particles along the guiding blades 5 results in a reaction or braking moment acting onto the measuring wheel 4, here used as the measuring effect. In this connection, the total mass flow M1 is determined, composed of the mass flow M2 of conveyed material or, here, pourable material and the air mass flow M3.

The measuring wheel 4 is connected via a shaft 6 to a driving motor 8 which is mounted swingingly and supports on a load cell 9 arranged at distance from the shaft 6, at changes of the driving torque proportional to the mass throughput. Hereby, the momentarily required driving torque for the measuring wheel 4 is determined, changing in direct proportion to the mass throughput. In view of this exact proportionality in the drawings the character M is used both for the individual mass flows M1, M2, M3, ... and for the associated measured moments or torques M1, M2, M3, ...

The flow M2 of pourable material to be measured and indicated in dash-dot lines in the upper half (of FIG. 1) is supplied by the charging device 2, here in a simple manner just a charging funnel 10, through a type of injector 11 into the central inlet region 7 of the measuring wheel 4 and leaves the latter after radial deflection by the guiding blades 5, with the mass flow being collected by a housing 12 surrounding the measuring wheel 4 and being conveyed into a connected feeding duct or an outlet for the pourable material.

In a simplified manner the embodiments will be explained for a flow of pourable material, as an example for material to be conveyed. In this connection, as an example, air is used as a conveying fluid, generally used in connection with the suggested apparatus. However, the suggested method and apparatus may be used as well in connection with all type of flowable components of equal or different composition and equal or different aggregate states. Flowable materials to be conveyed may particularly be flowable, fine solid materials, as sand, grain, flour, powders or granulate of any desired type. The conveying fluid may, in particular, comprise gases and again air, however, liquids or gas/liquid mixtures may be used as well. Thus, the suggested apparatus and method are adapted for the mass flow determination, preferably of heterogenic multiple material mixtures or, however, of mixtures having a homogenic composition. Furthermore, it should be noted that in addition to the throughput determination the total mass per predetermined time unit may be determined by integration in a corresponding well-known evaluation.

According to the invention there is now provided an air flow measuring device 3 for measuring the air mass flow M3 in addition to the mass flow measuring device 1 for measuring the overall mass flow M1, with the air flow measuring device 3 essentially comprising an air inlet 13, a vane wheel 14 for accelerating the conveying gas and a housing 15 and, if desired, a guiding wheel for equalizing the air flow M3 illustrated in the lower half (FIG. 1) in dashed lines. In the center of the housing 15 there is provided an outlet opening 16 for the air flow M3 dragging along as a pourable material flow M2 the pourable material in the supply funnel 10 and routing it via injector 11 into the central supply region 7 of the mass flow measuring device 1. For accelerating and measuring the conveying air flow M3 the vane wheel 14 is connected to a second driving motor 18 via a shaft 17 partially surrounding the first shaft 6 and supported independently therefrom, which driving motor 18 is journaled swingingly and supporting on a load cell 19 as well. By these means the reaction or braking moment of the passing conveying gas flow is reliably determined as a measuring value M3. The other load cell 9, however, will receive the measuring value M1 being proportional to the overall mass flow M1 flowing through the measuring device 1 as the sum of the pourable material mass flow M2 and the conveying gas mass flow M3. In contrast thereto, at the load cell 19 only the mass of the conveying air or the conveying fluid, respectively, is determined as a measuring value M3. By forming the difference (M1−M3) in an evaluation device 20 between the measuring values of load cell 9 and load cell 19, the mass or the throughput, respectively, of the conveyed material as such is determined as a measuring value M2, since by this design the influence of the air is subtracted which is detrimental in particular with high throughputs. By such a type of tare weighing between the conveying gas flow (measuring value M3) at the measuring device 3 and the determination of the overall mass flow comprising the conveying air and the pourable material flow and the mass flow measuring device 1 (measuring value M1) the detrimental influence of the conveying gas mass is eliminated, since the difference moment M2 for the pourable material mass flow to be measured is formed from (M1–M3).

For this purpose, FIG. 1 shows a particularly preferred solution with the two measuring devices 1 and 3 rotating in opposite direction such that oppositely directed torques M1 and M3 exist as measurements for the mass flows M1 and M3, as indicated by the arrows. The two swingingly suspended driving motors 8 and 18 act onto a single load cell such that the difference torque M2 directly appears at the load cell 9 and may be read at the evaluation device 20 as the mass flow and, respectively, may further be used for further manual or automatic control. For example, if a determined mass flow M2 of the conveyed material is too small for a predetermined metering, then the rotational speed of the measuring device 1 or of the measuring wheel 4, respectively, may be increased such that the quantity M2 sucked out of the injector 11 is increased. Alternatively or additionally, the rotational speed of the conveying wheel 14 may be increased such that by the higher air quantity or, more exactly, by the increased air mass flow M3 an increased flow M2 of pourable material is dragged along into the injector 11.

Figure 10:
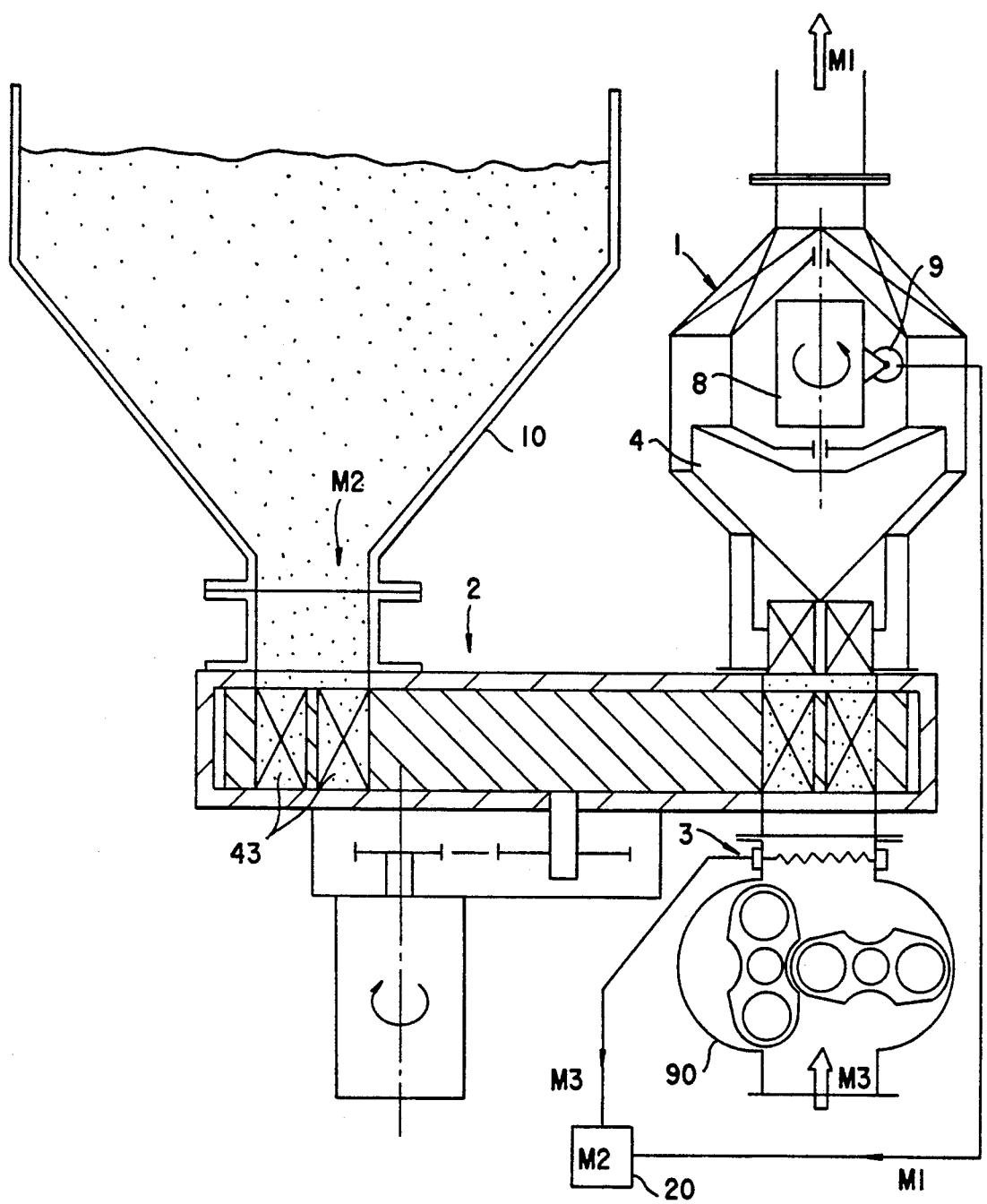
FIG. 10 shows a simplified embodiment, as compared with FIG. 4.

It should be noted that the conveying fluid measuring device 3 may be formed by a compressor as well whose driving torque is detected and is proportional to the passing conveying gas quantity M3, as explained in more detail in FIG. 10. The sensing of the torque at the conveying gas flow measuring device 3 and the mass flow measuring device 1 for the corresponding measuring values M3 and M1 may be designed differently from the illustrated torque measuring device 9, 19, using a rotatably supported motor, simultaneously forming the lever for a load cell, which arrangement could be replaced by a correspondingly exact measurement of the current flows to the driving motors 8 and 18.

Instead of the charging funnel 10 as a charging device 2 cellular wheel sluices, or conveying worms, or similar metering devices may be provided, as shown in the subsequent embodiments.

Figure 2:
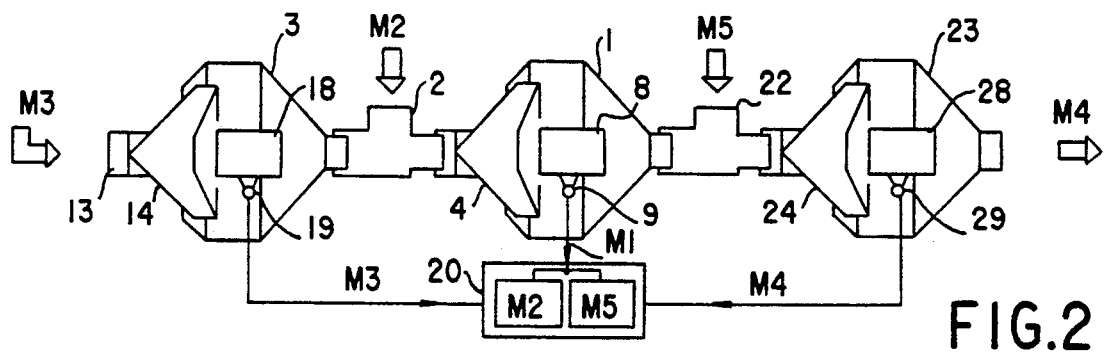
FIG. 2 is an embodiment modified in respect of FIG. 1.

FIG. 2 illustrates a modified embodiment where, as compared with the embodiment of FIG. 1, an additional measuring device 23 is connected in series by inserting a further charging device 22. The measuring device 23 is of essentially similar design with its main elements, as a measuring wheel 24, a driving motor 28 and a torque measuring device 29, however, with the driving motors, in contrast to the embodiment of FIG. 1, being arranged adjacent to the measuring and vane wheels 4, 14, and 24, respectively. Therefore, at the charging device 22 a further conveying material component M5 may be added as more frequently required for granulated mixtures. Alternatively, for example, at the air inlet 13 a gas component, at the charging device 2 a liquid component, and at the charging device 22 a solid component may be added. In proportion to the mass flow, the current Coriolis force is detected as the reaction torque at the load cells 9, 19, and 29 and transmitted to the evaluation unit as measuring signals M1, M3, and M4. As explained above, the difference torque M2 is formed of the measuring values M3 and M1, which difference moment is in direct proportion to the mass flow M2 of the component added at the charging device 2. This is true for the mass flow M5 as well of the component added at the charging device 22, with the difference moment M5 being formed of the overall mass flow measured at the measuring device 23 corresponding to the measuring value M4 and the measuring value M1 detected at the measuring device 1. The shown arrangement of three measuring devices may be expanded to a plurality thereof, such that a desired component may be detected for metering.

Figure 3:
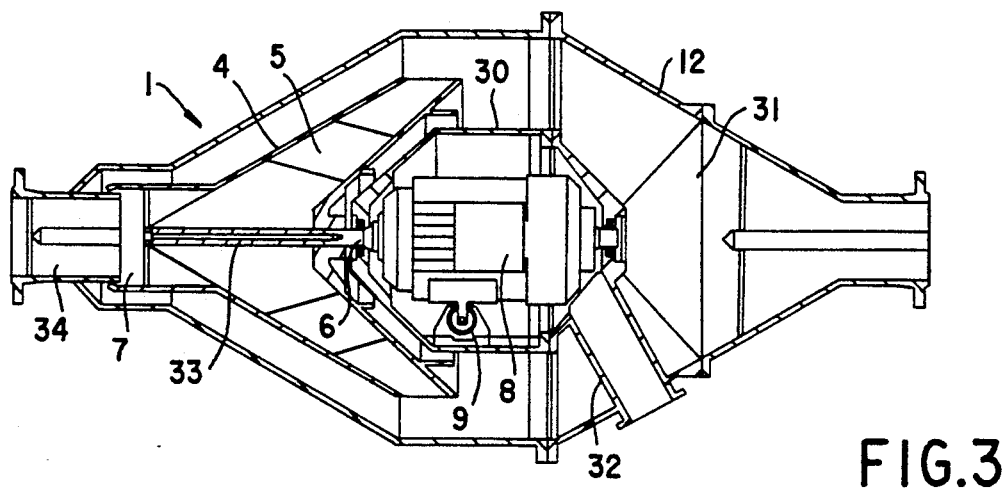
FIG. 3 is an enlarged illustration of a single measuring apparatus of FIG. 2.

FIG. 3 illustrates in an enlarged manner one of the three series-connected measuring devices of FIG. 2, specifically the middle measuring device 1. However, the two measuring devices 3 and 23 connected upstream and downstream, respectively, may have exactly the same design, such that a module-type production is possible. As compared with the measuring device of FIG. 1, here the driving motor 8 is arranged adjacent to the measuring wheel 4. The other reference numerals for elements having the same function correspond to those of FIG. 1. As apparent, the driving motor 8 is supported rotatably in an intermediate housing 30, such that its housing bears against the load cell 9 upon presence of the Coriolis force in measurement operation, and therefore detects the retarding torque which is in proportion to the momentarily passing mass flow. The intermediate housing 30 is connected via ribs 31 to the housing 12. Outward of the intermediate housing 30 a tube 32 extends, serving for removal of exhausted air of the driving motor 8 and for receiving the current supply cable and data lines from load cell 9. The measuring wheel 4 including radial guiding blades 5 extending up to the charging region 7 is connected via a drawbar 33 on the motor shaft of the driving motor 8. Upstream the charging region a flow rectifier 34 is provided for avoiding twisting (of the flow). The measuring wheel 4 is formed as an arrow in flowing direction, such that with a pneumatic conveyance an aerodynamically favorable conveyance of the pourable material and air flow is achieved. The angle of the arrow of the measuring wheel 4 is selected such that, depending on the density of the conveyed material, the latter is conveyed outward as much as possible without contacting the exterior and interior surfaces. For this purpose the ends of the guiding blades 5 facing the charging region 7 are bent off or edged off in rotational direction, such that the supplied conveyed material particles are immediately radially accelerated upon entering the measuring wheel 4, assuming the angular speed of the measuring wheel 4 as smoothly as possible. Hereby, as compared with conventional measuring wheels having an exclusively radial conveying component, the wear at the measuring wheel 4 and, in particular, at the measuring wheel disk facing the driving motor 8, is considerably reduced, in particular with abrasive conveyed material, as flue ash containing corrundum. The ribs 31 may be formed as a rectifier as well, such that there is accomplished a through-flow of the measuring device 1 as friction-free as possible. In this connection, the tube 32 may be formed ovally in flowing direction or may have a drop-type cross-section. The arrow-type design of the measuring wheel 4 further results in a compact assembly such that the measuring device is easy to be incorporated, in particular into pneumatic conveying systems. This will be shown by way of example referring to the subsequent Figures.

Figure 4:
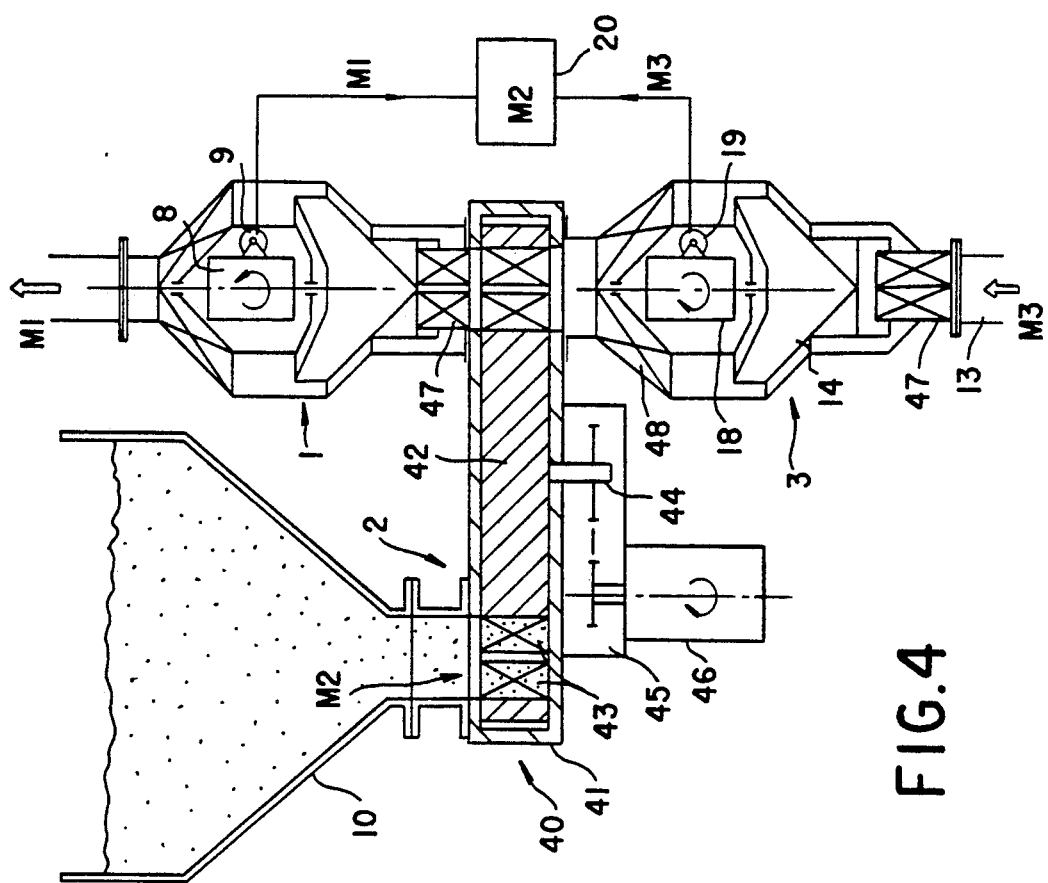
FIG. 4 shows a third embodiment, as used in connection with a metering rotor as a charging means.

FIG. 4 shows a third embodiment comprising, as the embodiment in FIG. 1, two measuring devices 1 and 3, here, however, in vertical arrangement. As a charging device 2 connected therebetween there is provided a through-blowing sluice 40 at the bottom side of a charging funnel 10, for instance for discharging from a bin. The through-blowing sluice 40 comprises a metering rotor 42 rotating about a driving shaft 44 in a closed housing 41. The metering rotor 42 is driven via a gearing 45 and a driving motor 46 with conveying pockets 43 arranged at the exterior periphery of the metering rotor 42 passing the charging opening below the charging funnel 10, which conveying pockets are blown out at the opposite side after a rotation by about 180° by conveying air supplied through the air inlet 13. The mass M3 of the conveying air is detected in a manner explained above by measuring the reaction moment M3 acting onto the conveying wheel 14, which moment is detected at the load cell 19. At the upper measuring device 1 the overall mass flow M1 of the conveyed material M2 sucked out of the charging funnel 10 together with the conveying gas M3 entering at the air inlet 13 are measured. By forming the difference between the moments detected at the load cells 9 and 19 (M1 minus M3) the difference moment M2 is formed which is in proportion to the mass of the supplied conveyed material. In order to achieve a through-flow through the measuring arrangement as smooth as possible, rectifiers 47 and 48 are provided upstream and downstream the conveying wheel 14 and the measuring wheel 4 each, such that an almost twist-free through-flow is achieved.

It should be noted that the conveying wheel 14 does not only serve for measuring the Coriolis force, but at the same time serves for causing an air flow for the conveying in vertical direction. The conveying or blowing effect of the conveying wheel 14 is completely sufficient for smaller conveying heights and light weight conveyed material. As a supplement there may be provided an additional blower at the air inlet 13.

Figure 5:
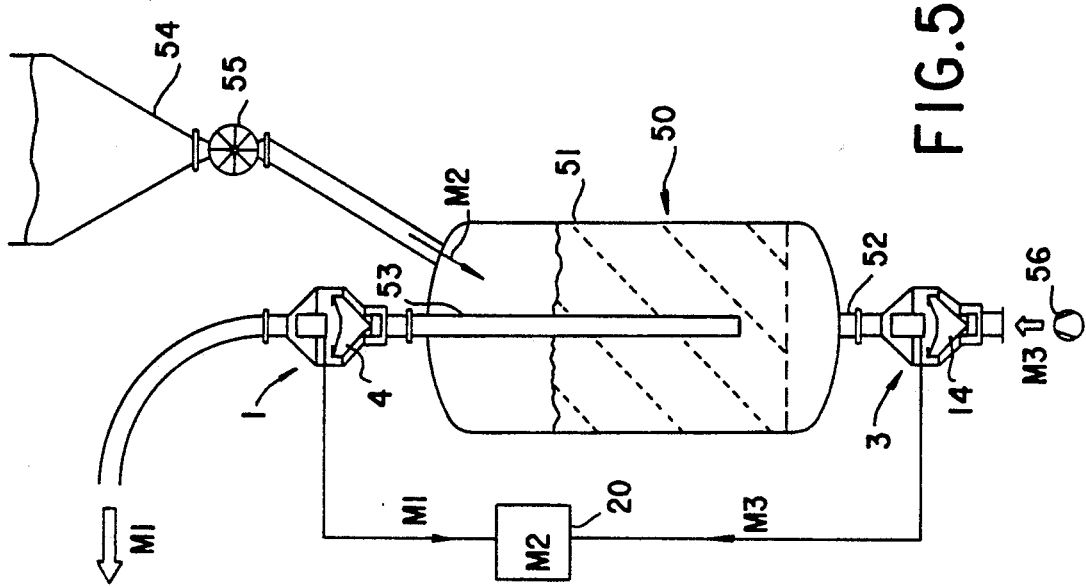
FIG. 5 shows a fourth embodiment used in connection with a flow bed sluice.

FIG. 5 illustrates a further embodiment using again two measuring devices 1 and 3 at a so-called flow bed sluice 50. The flow bed sluice 50 essentially comprises a hermetically closed pressure vessel 51 into which pressurized air is supplied at the bottom side 52 for fluidifying and loosening the conveyed material in the pressure vessel. By means of the measuring device 3, the mass M3 of the supplied pressurized air is determined. As indicated above, for supporting the conveying capability of the conveying wheel 14 a compressor or a blower 56 may be arranged upstream. From pressure vessel 51 the conveyed material passes through a conveying duct 53 to the measuring device 1 again detecting the overall mass flow M1 comprising the conveyed material mass flow M2 and the conveying fluid mass flow M3, here of the pressurized air. In this connection, the measuring wheel 4 of the measuring device 1 may advantageously serve for sucking the conveyed material in addition to the blowing-in of the pressurized air at the bottom side 52. For refilling the pressure vessel 51 there is provided a bunker 54 for pourable material, whose discharging quantity is controlled by means of a cellular wheel sluice 55 such that the level of conveyed material in the pressure vessel 51 is maintained approximately constant. The cellular wheel sluice 55 is designed such that there is achieved a sealing against leaking air as good as possible, such that the air quantity M3 flowing into the pressure vessel 51 and the overall mass flow M1 comprising the conveyed material and the conveying fluid leaving the pressure vessel 51 without leaking air may exactly be determined. In the evaluation device 20 the conveyed material mass flow M2 is determined by forming the difference (M1-M3) of these measuring values.

Figure 6:
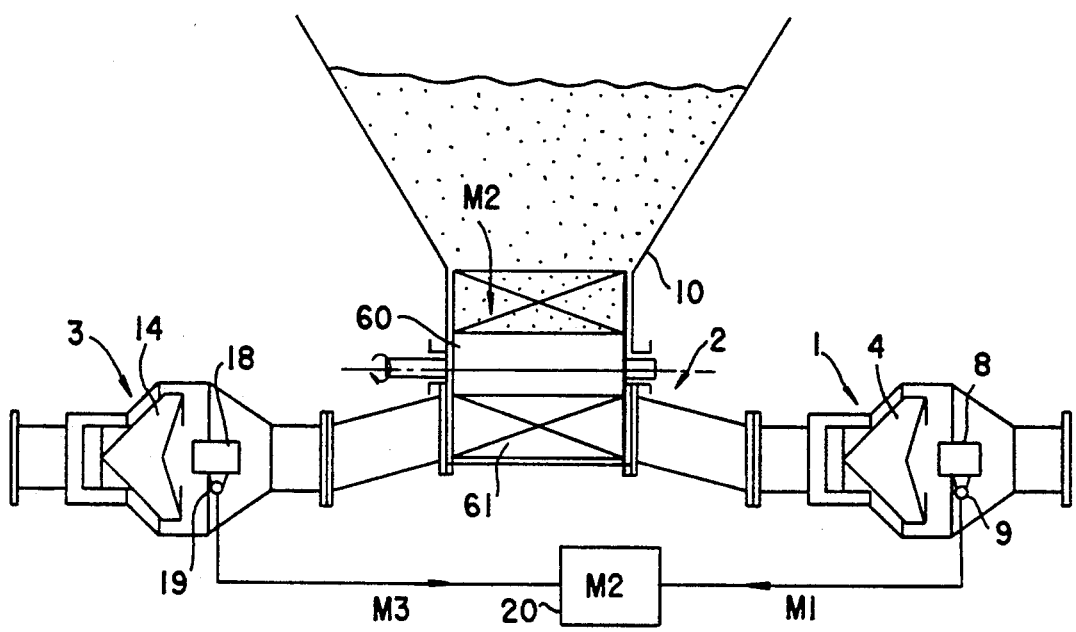
FIG. 6 shows a fifth embodiment in a horizontal arrangement.

FIG. 6 illustrates a fifth embodiment having a similar design as in FIG. 4, however, with an essentially horizontal arrangement. As a charging device 2 a metering drum 60, rotating about a horizontal axis, is provided between the measuring arrangement 1 for the overall mass flow M1 and the measuring arrangement 3 for the air mass flow M3. The metering drum 60 is provided with recesses 61 at its outer periphery, which recesses, after taking along the conveyed good from the charging funnel 10, rotate downward from where it is conveyed to the right to the measuring device 1 by means of the conveying air entering through the measuring device 3. As explained above, there, at a load cell 9, again the moment proportional to the overall mass flow M1 of conveyed material and conveying air is measured and transmitted to the evaluation device 20. There, the reaction moment M3 proportional to the mass flow of the conveying air, detected by the load cell 19, is subtracted such that the mass flow M2 of the conveyed material is obtained without the detrimental moment caused by the conveying fluid.

Figure 7:
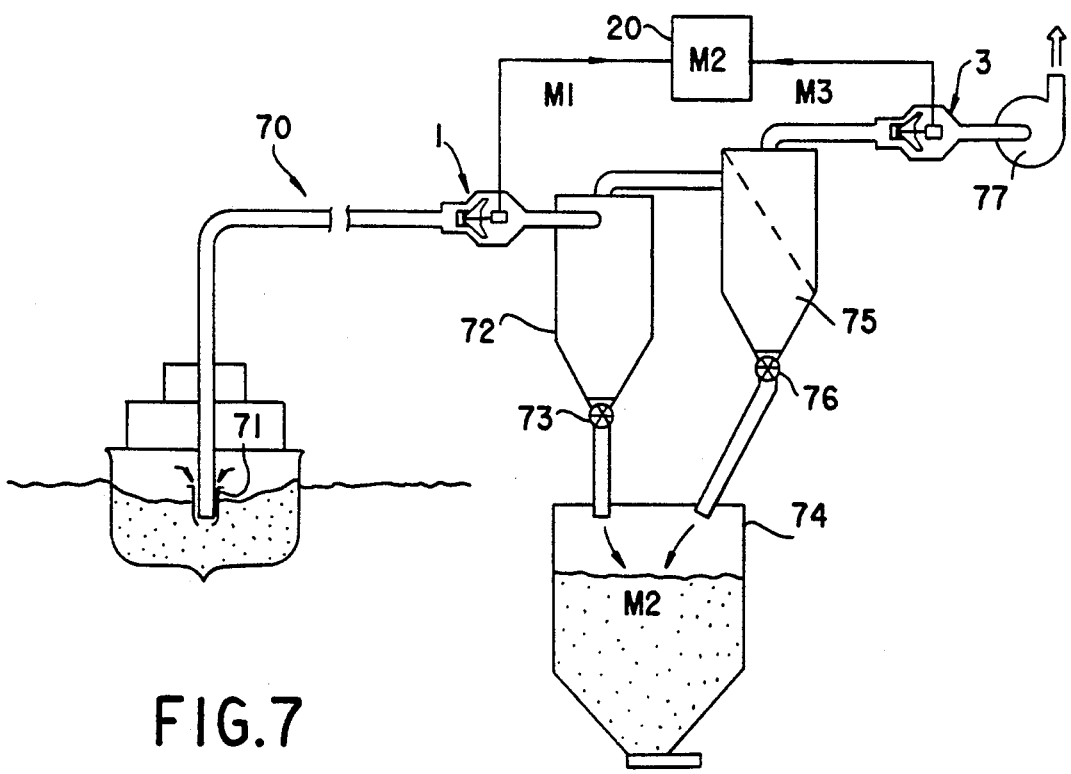
FIG. 7 shows a sixth embodiment, as used in a suction conveying system.

FIG. 7 illustrates a sixth embodiment which is quasi the reversion of the embodiments explained before, used with a suction conveying system 70. A suction nozzle 71 sucks conveyed material indicated in a dot line out of a ship body, with the suction nozzle 71 sucking-in considerable air quantities. The conveyed-material/conveying-air mixture first passes the measuring device 1, thus determining the overall mass flow M1 of the conveyed material plus conveying fluid. The conveyed material is then essentially separated in a cyclon separator 72 from the sucked-in conveyed-material/conveying-fluid mixture and conveyed via a cellular wheel sluice 73 to a bin 74. Here, the cellular wheel sluice 73 serves for sealing the overall suction system. From the cyclon separator 72 the conveying fluid only containing small quantities of conveyed material gets into a filter 75, where again a high percentage of conveyed material is separated and supplied to the bin through a cellular wheel sluice 76. The conveying air flows from the filter 75 through the measuring device 3 to a suction blower 77 operating essentially the overall suction conveying system 70. Therefore, with the measuring device 3 the mass flow M3 of the conveying air with residual fine dust is detected.

In this connection, it is essential that even fine dusts not separated in the filter 75, but taking a considerable share in determining the mass flow, are detected. On forming the difference (M1-M3) between values measured at the measuring devices 1 and 3 in the evaluation device 20, the differential torque resp. the differential mass flow of the material M2 conveyed to the bin 74 is detected. Thus, measuring errors in the range of some percents are avoided.

FIGS. 8, 8A and 8B schematically show a further embodiment of measuring devices 1 and 3 being connected in series. In this connection, it is essential that the two measuring and conveying wheels 4 and 14, respectively, are driven by a single motor 8. This not only saves a second driving motor 18, but ensures an exactly synchronized operation and, therefore, exactly the same rotational speed of the two measuring rotors 4 and 14. Furthermore, this permits to control the rotational speed of the two measuring wheels 4 and 14 for controlling the mass throughput. For example, this has the advantage that, when using an injector or a suction lifter as a charging device, the pourable material quantity proportional to the increased gas quantity may be regulated without any additional adjusting member. Furthermore, it is of importance with this embodiment that the torque measurement is performed outside the housing 12 and, therefore, outside the flowing path of the conveyed material and the conveying fluid. This is of advantage in particular in connection with aggressive components. The measuring wheels 4 and 14 are supported by cantilever arms 80 and 81 connected by an intermediate tube 82. The latter and the cantilevers 80 and 81 enclose in a dust-tight manner a gearing, preferably two belt drives 83 having an intermediate shaft 84. The cantilever arms 80 and 81 project into closed recesses 88 of the housing 12, which recesses surround the cantilever arms with a small loose. With such an arrangement the cantilever arms 80 and 81 may slightly turn, as the only freedom of movement at pivoting bearings 89, about the shafts 6 and 17 of the measuring wheels 4 and 14 and, thus, transmit torque changes. As may be gathered from the associated cross-section along the section line A—A through the cantilever 81 by means of the intermediate shaft 84, a reversion of the rotational direction is achieved such that the two measuring wheels 4 and 14 rotate in opposite directions. At the intermediate tube 82 a parallelogram lever linkage 85 is attached acting via a vertical lever 86 on the load cell 9' provided for torque measurement, as may be gathered from the sectional view according to the section line B—B. The parallelogram linkage 85 is designed such that the intermediate tube 82 is statically determined and held. The lever 86 is stationary supported for bearing onto a support point 87, f.i. at particularly friction-poor crossed spring hinges. Due to the opposite rotational directions of the measuring wheels 4 and 14 the displacement of the lever linkage 85 and, therefore, the loading of the load cell 9' (see associated section B—B) is proportional to the difference torque between the measuring devices 1 and 3. This difference torque is in turn proportional to the mass flow of the conveyed material such that upon a corresponding calibration of the load cell 9' and in consideration of the length of the lever 86, the mass flow of the conveyed material may directly be determined without any error influence by the conveying air. In this connection, it is of particular advantage, that the lever linkage 85 has a considerably lower friction than a rolling bearing and that the pivot bearings 89, in view of their direct attachment to the shafts 6 and 17, easily respond to torque changes. Furthermore, in the sectional view B—B in dash-dot lines, a passage is indicated in the cantilever arm 81 and the recess 88, such that thrown-off conveyed material may pass, provided that the belt drive 83 is arranged at the extreme outer end of the cantilever arm 81 and is encapsulated.

FIGS. 9 and 9A show an embodiment similar to that of FIG. 8, where, however, the measuring devices 1 and 3 with their measuring wheels 4 and 14 are in parallel arrangement rather than series-connected. Furthermore, a separate driving motor 8 and 18, respectively, is provided for each measuring device. In view of the parallel arrangement, torque sensing may be accomplished through a double-side parallelogram lever linkage 85, again mounted at a supporting point 87 and acting onto the load cell 9' via a vertical lever 86. Again, by this arrangement, a measuring value in proportion to the difference moment (M1-M3) is detected at load cell 9'. This arrangement is, for example, also adapted for the suction conveying system 70 in FIG. 7, by arranging the measuring devices 1 and 3 thereof beside each other by means of a corresponding arrangement of the conveying path. In view of the double-side parallelogram linkage, as it is illustrated in particular in the sectional view along the section line C—C associated to FIG. 9, only a very simple evaluation device 20 is required, since the difference is formed by the opposite arrangement at the parallelogram linkage 85. In accordance with the suction conveying system 70 in FIG. 7, for example, the overall quantity M1 of the conveyed material plus the feeding fluid could be conveyed through the left measuring device 1 whilst the separated air M3 together with fine dust after the filter 75 may be passed through the right measuring device 3. Though here the two measuring devices have the same direction of flow, one of the measuring devices could convey in opposite direction, for instance by a mirror-type arrangement along the section line C—C.

FIG. 10 shows a simplified embodiment differing from the embodiment in FIG. 4 essentially by the fact that the measuring device 3 for the conveying fluid is not formed by a Coriolis measuring wheel including torque detection, but that at a rotating piston blower 90 there is provided, as the measuring device 3, a schematically illustrated heating via air quantity or air mass meter, respectively, for measuring the mass flow of the feeding fluid. As a measuring value for the air mass flow the driving torque for the rotating piston blower may be detected or a corresponding back pressure flap or similar air quantity meter may be used, known from motor cars for measuring the induction air. Alternatively, the impact or back pressure may be used for detecting the conveying air mass flow M3. Of course, depending on the required conveying pressure, the rotating piston blower 90 may be replaced by a worm or screw compressor or a radial blower. The values measured by the measuring device 3 are transmitted to the evaluation device 20 and, there, converted into a measuring value in proportion to the air mass flow M3. Again, the difference M1-M3 is formed of the measuring value of the load cell 9 (identical with that of FIG. 4) as a direct measure for the mass flow of the conveyed material out of the charging funnel 10 together with the conveying air, such that the net mass flow M2 of the conveyed material as such is determined without any detrimental influence of the additional conveying air mass.

Figure 11:
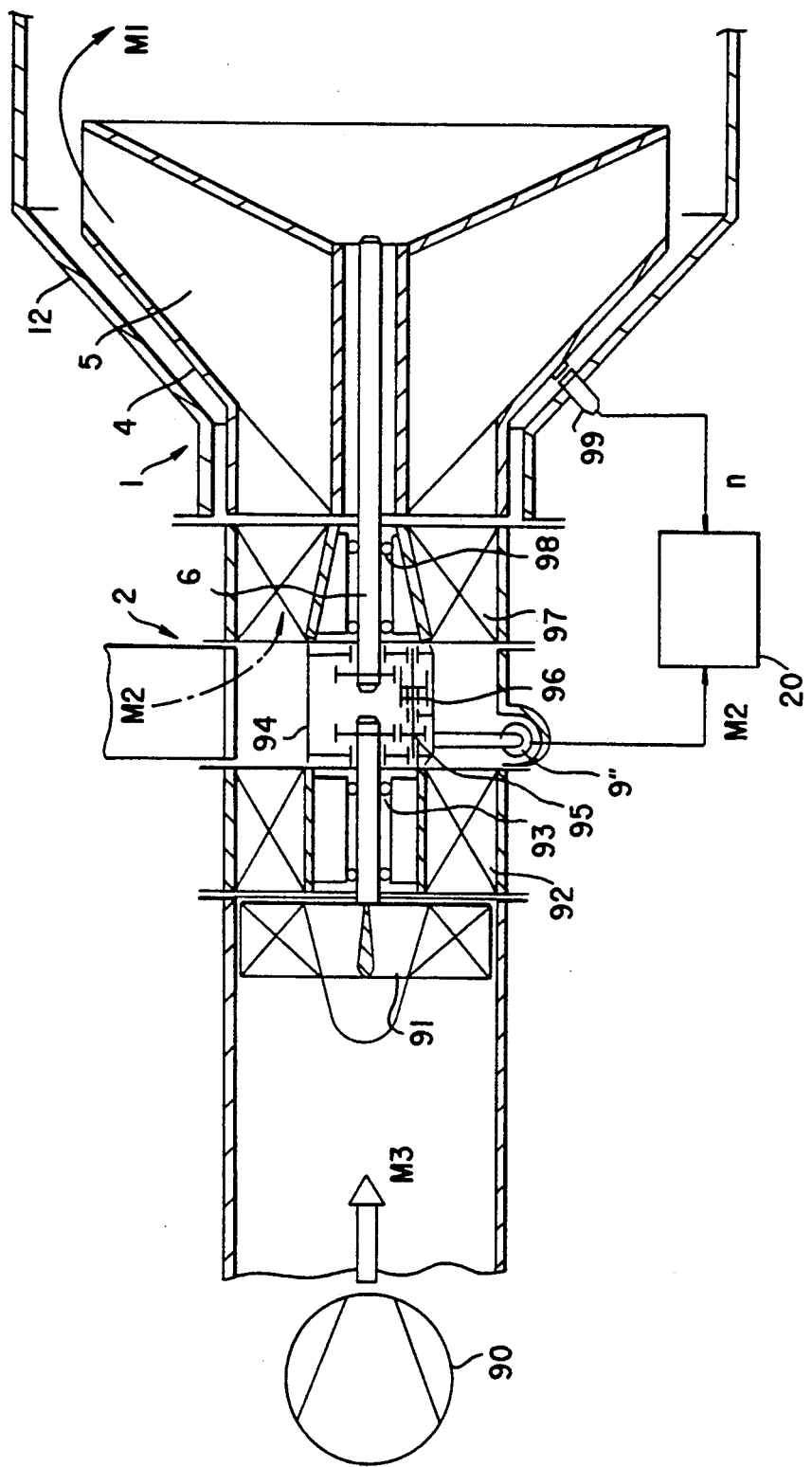
FIG. 11 shows a further embodiment comprising a drive incorporated therein.

FIG. 11 shows a further embodiment where the mass flow of the air quantity M3 supplied by a compressor 90 is detected in a turbine 91 whose turbine wheel forms the measuring device 3 for the conveying fluid. In contrast to the heating wire meter of FIG. 10, the turbine 91 is adapted for liquids as well and has the particular advantage that the turbine 91 simultaneously serves as an air or liquid motor for driving the measuring wheel 4 of the measuring device 1. The torque caused at the turbine 91 by the fluid flow M3 is transmitted through its shaft mounted in a rectifier 92 at the position 93 to a schematically illustrated reversing gear mechanism 94. There, the torque of the turbine 91 is transmitted and, if desired, reduced onto the shaft 6 of the measuring wheel 4 via an intermediate shaft 95 and a reversion wheel 96. The shaft 6 is mounted by a bearing 98 in a further rectifier 97. The gearing housing 94 is rotatably mounted on the two shaft ends and bears against a load cell 9" via a laterally extending lever. Since the turbine 91 and the measuring wheel 4 rotate in opposite direction, the torque acting onto the load cell 9" corresponds to the difference of the clockwise and the counter-clockwise acting moments, here the moment M1 for the overall mass flow minus the moment M3 for the conveying air. The difference moment M2 for the applied conveyed material quantity M2 may directly be obtained at the load cell 9" and transmitted to the evaluation or indication device 20 having connected thereto a rotational speed measuring device 99. By forming the product (M2×n) the throughput may be determined and, for instance, by increasing the throughput of the compressor 90, the rotational speed of the turbine 91 and, therefore, the measuring wheel 4 as well as the suction input of the conveyed material flow M2 at the charging device may be increased. Thus, in a simple manner maintaining a constant or desired mass throughput is controlled. Since with this embodiment no separate driving motor is necessary for the measuring wheel, as the driving energy thereof is caused by the conveying fluid, this embodiment is particularly adapted for widely branched-out pneumatic conveying systems.

The above description is included to illustrate the preferred embodiments and the operations thereof, and is not intended to limit the scope of the invention. The scope of the invention is to be limited only by the following claims. From the above discussion, many variations are apparent to one skilled in the art which would yet be encompassed by the spirit and scope of the invention.

I claim

1. A method for measuring the mass throughput of material added to a conveying fluid according to the Coriolis principle, comprising the steps of:
    providing an essentially closed material conveying system having a material charging station and a conveying fluid supply means upstream thereof;
    determining mass throughput of conveying fluid supplied to said system;
    charging said material to said system to be conveyed by said conveying fluid;
    guiding a flow of said conveying fluid carrying said material into a first rotating measuring means for measuring effective inertia force thereof based on the Coriolis principle and for determining mass throughput of said flow; and
    subtracting said mass throughput of said conveying fluid supplied to said system from said mass throughput determined in said rotating measuring means.

2. The method of claim 1, wherein said step of determining mass throughput of the conveying fluid is performed when supplying said conveying fluid to said system.

3. The method of claim 1, wherein said step of determining mass throughput of the conveying fluid is performed after separating said conveying fluid from said conveyed material after said flow having passed a first Coriolis principle measuring means.

4. An apparatus for measuring the mass throughput of material added to a conveying fluid according to the Coriolis principle, comprising:
    an essentially closed conveying system having inlet means for supplying said conveying fluid to said system and a charging station for charging material into said system for being conveyed by said conveying fluid;
    first measuring means for measuring effective inertia force thereof based on the Coriolis principle, said measuring means being incorporated in said system and having supplied thereto a flow of said conveying fluid carrying said material charged thereto, said first measuring means including rotatably driven measuring wheel means having guiding blades for radially deflecting said flow and means for determining changes in a driving torque acting on said measuring wheel means, which changes are in direct proportion to said mass throughput of said flow;
    means for determining mass throughput of said conveying fluid supplied to said system; and
    means for subtracting said mass throughput of said conveying fluid supplied to said system from said mass throughput of said flow determined by said first measuring means.

5. The apparatus of claim 4, wherein said means for determining said mass throughput of said conveying fluid supplied to said system comprises a second measuring means.

6. The apparatus of claim 4, wherein said first measuring means comprises force measuring means for determining said changes of said driving torque.

7. The apparatus of claim 5, wherein said second measuring means comprises a second driven measuring wheel and a second means for measuring changes in a driving torque acting on said second measuring wheel, said first and second torque measuring means acting oppositely onto a common force measuring means.

8. The apparatus of claim 4, further comprising charging station means and another measuring means for measuring effective inertia force based on the Coriolis principle on a different material to be charged to said conveying system.

9. The apparatus of claim 4, wherein said charging station comprise a blowing-in sluice including a metering rotor.

10. The apparatus of claim 4, wherein said charging station comprises a flowing bed sluice.

11. The apparatus of claim 4, wherein said conveying system is formed as a suction conveying system, further comprising means for separating said conveyed material from said conveying fluid, said means for determining throughput of said conveying fluid supplied to said system being connected to an outlet for said conveying fluid of said separating means.

12. The apparatus of claim 5, wherein said measuring means comprises first and second measuring wheel means which are driven in opposite directions.

13. The apparatus of claim 12, wherein said first measuring wheel means are mounted on cantilever arm means outside of said closed conveying system.

14. The apparatus of claim 12, wherein said second measuring wheel means are mounted on cantilever arm means outside of said closed conveying system.

15. The apparatus of claim 13, wherein between said cantilever arm means and said first measuring means there is arranged a parallelogram-type lever linkage means.

16. The apparatus of claim 14, wherein between said cantilever arm means and said second measuring means there is arranged a parallelogram-type lever linkage means.

17. The apparatus of claim 12, wherein said first measuring means and said second measuring means are arranged in parallel to each other and are supported via a double-side parallelogram lever linkage means on a common force measuring means.

18. The apparatus of claim 5, wherein said means for determining mass throughput of said conveying fluid is formed by a compressor whose driving torque is measured for determining mass throughput of said conveying fluid.

19. The apparatus of claim 5, wherein said means for determining mass throughput of said conveying fluid is formed by a heating wire air quantity meter.

20. The apparatus of claim 5, wherein said measuring means comprises first measuring wheel means, and wherein said means for determining mass throughput of said conveying fluid comprises a turbine means for driving said first measuring wheel means.

21. The apparatus of claim 20, wherein said turbine means and said first measuring wheel means are coupled to a reversion gear mechanism for rotating in opposite directions, said reversion gear mechanism being mounted on shafts of said turbine and said first measuring wheel means, respectively, and bearing against a force measuring means.

22. The apparatus of claim 5, wherein rotational speeds of said first measuring wheel means and said means for determining said mass throughput of said conveying fluid are controllable for setting a predetermined mass throughput of the material to be conveyed.

* * * * *